(12) United States Patent
Chidlovskii et al.

(10) Patent No.: US 8,015,126 B2
(45) Date of Patent: Sep. 6, 2011

(54) SCALABLE FEATURE SELECTION FOR MULTI-CLASS PROBLEMS

(75) Inventors: Boris Chidlovskii, Meylan (FR); Loic Lecerf, Biviers (FR)

(73) Assignee: Xerox Corporation, Norwalk, CT (US)

( * ) Notice: Subject to any disclaimer, the term of this patent is extended or adjusted under 35 U.S.C. 154(b) by 805 days.

(21) Appl. No.: 12/107,875

(22) Filed: Apr. 23, 2008

(65) Prior Publication Data

US 2009/0271338 A1     Oct. 29, 2009

(51) Int. Cl.
    *G06F 15/18* (2006.01)
(52) U.S. Cl. .......................................... 706/12
(58) Field of Classification Search ...................... 706/12
    See application file for complete search history.

(56) References Cited

OTHER PUBLICATIONS

Singhi et al., "Feature Subset Selection Bias for Classification Learning," Proceedings 23rd International Conference on Machine Learning, Pittsburgh, PA (2006).
Hall, "Correlation-based Feature Selection for Discrete and Numeric Class Machine Learning," ICML '00: Proceedings of the 17th International Conference on Machine Learning (1994).
Kohavi et al., "Wrappers for Feature Subset Selection," Artificial Intelligence, 97(1-2):273-323, (1997).
Koller et al., "Toward Optimal Feature Selection," ICML '96: Proc. 13th International Conference on Machine Learning, Ca (1996).
Liu et al., "Toward Integrating Feature Selection Algorithms for Classification and Clustering," IEEE Transactions on Knowledge and data Engineering, 17(4):491-502 (2005).
Yu et al., "Efficient Feature Selection via Analysis of Relevance and Redundancy," Journal Mach. Learn. Res., 5:1205-1224 (2004).

*Primary Examiner* — Jeffrey A Gaffin
*Assistant Examiner* — Vincent Gonzales
(74) *Attorney, Agent, or Firm* — Fay Sharpe LLP

(57) ABSTRACT

In a feature filtering approach, a set of relevant features and a set of training objects classified respective to a set of classes are provided. A candidate feature and a second feature are selected from the set of relevant features. An approximate Markov blanket criterion is computed that is indicative of whether the candidate feature is redundant in view of the second feature. The approximate Markov blanket criterion includes at least one dependency on less than the entire set of classes. An optimized set of relevant features is defined, consisting of a sub-set of the set of relevant features from which features indicated as redundant by the selecting and computing are removed.

21 Claims, 2 Drawing Sheets

| Y | $F_1$ | $F_2$ |
|---|---|---|
| $y_0$ | 0 | 0 |
| $y_0$ | 0 | 0 |
| $y_0$ | 0 | 0 |
| $y_0$ | 1 | 1 |
| $y_0$ | 1 | 1 |
| $y_0$ | 1 | 1 |
| $y_1$ | 0 | 0 |
| $y_1$ | 0 | 1 |
| $y_2$ | 0 | 0 |
| $y_2$ | 1 | 0 |

SCALABLE FEATURE SELECTION FOR MULTI-CLASS PROBLEMS

BACKGROUND

The following relates to the informational, classification, clustering, data storage, and related arts.

Categorization is a useful operation in the informational arts. In a supervised learning approach, a training set of objects, such as documents, images, or so forth, are provided with pre-determined class labels. Features of the objects are extracted, and a classifier is trained to identify class members based on characteristic features identified from the training set. In some approaches, the class labels may not be provided a priori but rather extracted by grouping together objects of the training set with similar sets of features. This is sometimes referred to as unsupervised learning or clustering.

The computational complexity of categorization increases rapidly with increasing numbers of objects in the training set, with increasing number of features, and with increasing number of classes. For multi-class problems, a substantially sized training set and a substantial number of features is typically employed to provide sufficient information from which to differentiate amongst the multiple classes. Thus, multi-class problems are by nature generally computationally intensive.

One way to reduce this complexity is to reduce the number of features under consideration. By reducing the number of features, advantages such as faster learning and prediction, easier interpretation, and generalization are typically obtained. However, the removal of features should be done in a way that does not adversely impact the classification accuracy. Accordingly, one would generally like to filter out irrelevant or redundant features.

Irrelevant features are those which provide negligible distinguishing information. For example, if the objects are all dogs, cats, or squirrels, and it is desired to classify each new animal into one of these three classes, the feature of color may be irrelevant if each of dogs, cats, and squirrels have about the same distribution of brown, black, and tan fur colors. In such a case, knowing that an input animal is brown provides negligible distinguishing information for classifying the animal as a cat, dog, or squirrel. Features which are irrelevant for a given classification problem are not useful, and accordingly a feature that is irrelevant can be filtered out.

Redundant features are those which provide distinguishing information, but are cumulative to another feature or group of features that provide substantially the same distinguishing information. Using the previous example, consider illustrative "diet" and "domestication" features. Dogs and cats both have similar carnivorous diets, while squirrels consume nuts and so forth. Thus, the "diet" feature can efficiently distinguish squirrels from dogs and cats, although it provides little information to distinguish between dogs and cats. Dogs and cats are also both typically domesticated animals, while squirrels are wild animals. Thus, the "domestication" feature provides substantially the same information as the "diet" feature, namely distinguishing squirrels from dogs and cats but not distinguishing between dogs and cats. Thus, the "diet" and "domestication" features are cumulative, and one can identify one of these features as redundant so as to be filtered out. However, unlike irrelevant features, care should be taken with redundant features to ensure that one retains enough of the redundant features to provide the relevant distinguishing information. In the foregoing example, one may wish to filter out either the "diet" feature or the "domestication" feature, but if one removes both the "diet" feature and the "domestication" feature then useful distinguishing information is lost.

Existing feature filtering techniques are generally effective at identifying and filtering out irrelevant features. Identifying irrelevant features is relatively straightforward because each feature can be considered in isolation. On the other hand, identifying redundant features has been found to be more difficult, since the analysis entails comparing distinguishing information provided by different features and selecting a sub-set of the redundant features for removal.

Another issue with feature filtering is scalability. Some filtering techniques are effective for a relatively small numbers of features, but perform less well as the feature set size increases. This is disadvantageous for multi-class problems where the feature set size is usually selected to be relatively large in order to provide sufficient information to provide effective differentiation amongst the multiple classes.

One feature filtering technique is known as the fast correlation based filtering (FCBF) technique. In the FCBF approach, irrelevant features are first identified and filtered out, and the remaining features are ranked by relevance. Redundant features are then identified using an approximate Markov blanket configured to identify for a given candidate feature whether any other feature is both (i) more correlated with the set of classes than the candidate feature and (ii) more correlated with the candidate feature than with the set of classes. If both conditions (i), (ii) are satisfied, then the candidate feature is identified as a redundant feature and is filtered out.

The FCBF technique has been found to be generally effective for binary classification problems, and is scalable to large feature set sizes. However, the FCBF filtering technique has been found to be less effective for multi-class problems in that it sometimes filters out too many features leading to loss of valuable information.

BRIEF DESCRIPTION

In some illustrative embodiments disclosed as illustrative examples herein, a method is disclosed including filtering a set of features to remove selected features that are substantially redundant respective to relating a set of classes and a set of training objects classified respective to the set of classes, the feature filtering method comprising: selecting a candidate feature of the feature set; measuring redundancy of the candidate feature respective to a second feature based on comparison of an estimated uncertainty reduction respective to the set of training objects provided by the candidate feature and provided by the second feature, the estimated uncertainty reductions being further respective at least in part to a sub-set of the classes that is smaller than the set of classes; filtering out the candidate feature if the approximated redundancy satisfies a filtering criterion; and repeating the selecting, approximating, and filtering for a plurality of pairs of candidate and second features to generate a filtered set of features.

In some illustrative embodiments disclosed as illustrative examples herein, a storage medium is disclosed storing instructions executable to perform a feature filtering method comprising (i) providing a set of relevant features and a set of training objects classified respective to a set of classes, (ii) selecting from the set of relevant features a candidate feature and a second feature, (iii) computing an approximate Markov blanket criterion indicative of whether the candidate feature is redundant in view of the second feature, the approximate Markov blanket criterion including at least one dependency on less than the entire set of classes, and (iv) defining an optimized set of relevant features consisting of a sub-set of the set of relevant features from which features indicated as redundant by the selecting and computing are removed.

In some illustrative embodiments disclosed as illustrative examples herein, a classifier trainer is disclosed, comprising a processor configured to perform a method comprising: training a classifier to classify an object respective to a set of classes, the training employing a set of pre-classified training objects and an optimized set of relevant features; selecting the optimized set of relevant features from a set of relevant features using an approximate Markov blanket criterion that includes at least one dependency on less than the entire set of classes; and selecting the set of relevant features from a set of features based on relevance of the features to the classifications of the set of pre classified training objects.

DETAILED DESCRIPTION

Figures 1, 2:
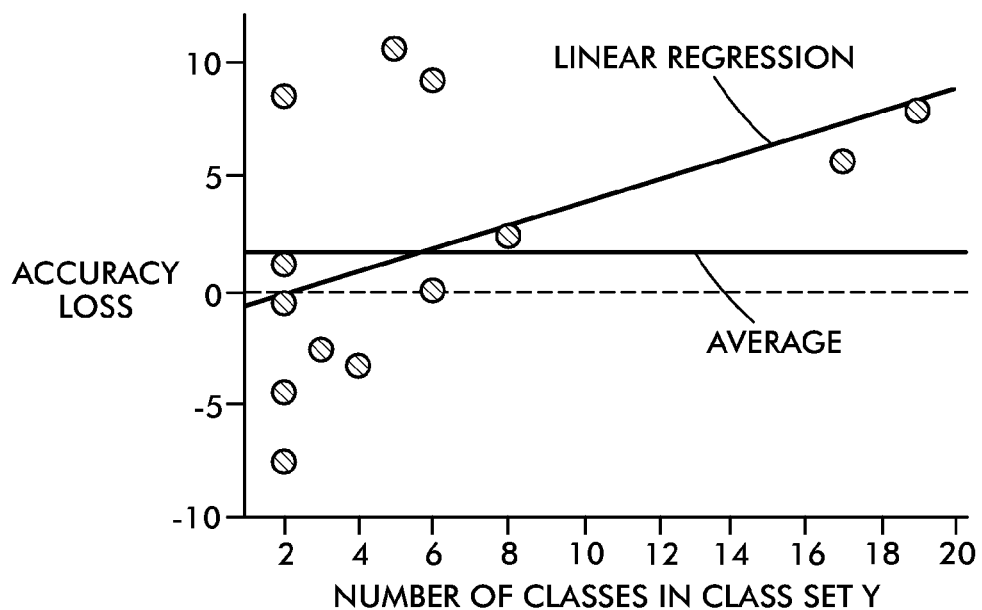
FIG. 1 plots accuracy loss versus number of classes in the set of classes, where the accuracy loss compares classifier accuracy (i) when trained using a set of features filtered by the fast correlation based filtering (FCBF) technique and (ii) when trained using the full set of features.
FIG. 2 shows a table presenting results abstracted from various cases reported with reference to FIG. 1, in which the FCBF causes the accuracy loss.

The following notation is used in the illustrative examples set forth herein. The uncertainty of a random variable X is characterized herein by the entropy of variable X which is denoted H(X) and is defined as $$H(X) - \sum_x P(x)\log_2(P(x)),$$

where P(x) is the distribution of the random variable X, that is, P(x) is the probability that the random variable X assumes the value x. Given two random variables X, Y, it is useful to characterize the information one random variable provides about the other. This is characterized herein by a mutual information denoted as I(Y;X) employing a Kullback-Leibler (KL) divergence between the joint distribution P(Y,X) and the product of its marginal distributions P(Y)P(X), and is given by:

$$I(Y; X) = D_{KL}(p(Y, X) \| P(Y)P(X)) \quad (1)$$

$$= \sum_{x,y} P(y, x)\log_2\left(\frac{P(y, x)}{P(y)P(x)}\right)$$

$$= \sum_{x,y} P(y, x)\log_2(P(y|x)) - \sum_{x,y} P(y, x)\log_2(P(y))$$

$$= \sum_{x,y} P(y|x)P(x)\log_2(P(y|x)) - \sum_y P(y)\log_2(P(y))$$

$$= H(Y) - H(Y|X)$$

where P(x) is the prior probabilities of x∈X, P(y|x) is the posterior probabilities of y∈Y given the values of x∈X, and the conditional entropy H(Y|N) is the entropy of variable Y after observing values of variable X, given by:

$$H(X|Y) = \sum_x P(x) \sum_y P(y|x)\log_2(P(y|x)). \quad (2)$$

When applied to feature selection, the mutual information is the amount by which the entropy of one variable decreases from the knowledge of another variable. The mutual information I(Y;X), also called the information gain, is symmetrical for two variables Y and X, that is I(Y;X)=I(X;Y). Since it is sometimes biased in favor of features with more values, the values are normalized herein to ensure that they are comparable. Accordingly, in the illustrative examples herein the following symmetrical uncertainty SU(Y,X)=SU(X,Y) is defined as:

$$SU(Y, X) = \frac{2I(Y; X)}{H(Y) + H(X)}. \quad (3)$$

The symmetrical uncertainty SU(Y,X) is normalized to the range [0,1] where the value SU(Y,X)=0 indicates that the variables X and Y are independent (that is, not relevant to one another) and the value SU(Y,X)=1 indicates that the value of X completely predicts the value of Y (and vice versa, that is, the variables X and Y are highly relevant to one another). The symmetrical uncertainty SU( . . . ) is used herein as a measure of relevance; however, other measures of relevance of random variable are also contemplated for use in the feature filtering techniques disclosed herein.

Having set forth a suitable notation, the concept of a Markov blanket is next defined. For a dataset S having a features set F={$f_1, f_2, \ldots, f_N$} and class labels Y, a relevant feature $f_i \in F$ is redundant if it has a Markov blanket $M_i \in F$ in the set of features F={$f_1, f_2, \ldots f_N$} (not counting the feature $f_i$ itself) which subsumes the information feature $f_i$ has about the target Y and all other features in F−$M_i$−{$f_i$}. This condition is satisfied if:

$$P(F-M_i-\{f_i\}, Y|f_i, M_i) = P(F-M_i-\{f_i\}, Y|M_i) \quad (4).$$

The Markov blanket filtering is a backward elimination procedure, which at any iteration removes feature $f_i$ if there exists a Markov blanket $M_i$ for $f_i$ among the features remaining in the set of features F. The process guarantees that a feature removed in a previous iteration will be still redundant later, and removing a feature in a later iteration will not render the previously removed features necessary to be included in the optimal set $F_{opt}$.

However, finding an exact Markov blanket for a feature entails an exhaustive enumeration of feature subsets which makes the exact Markov blanket filtering of Equation (4) computationally prohibitive for practical feature sets. Accordingly, scalable filtering algorithms approximate the Markov blanket. In the fast correlation-based filtering (FCBF) technique, for example, the following approximate Markov blanket criterion is used:

Feature $f_{pivot}$ is an approximate Markov blanket for feature $f_{cand}$ if $$SU(Y, f_{pivot}) \geq SU(Y, f_{cand}) \text{ and}$$

$$SU(f_{pivot}, f_{cand}) > SU(Y, f_{pivot}) \quad (5)$$

in conjunction with the following FCBF algorithm:

1. INPUTS: S,Y,F = {$f_1, f_2, \ldots, f_N$},δ,AMB( ),$F_{opt}$ = {empty}
2. OUTPUT: $F_{opt}$
3. for i = 1, . . . ,N do
4.    calculate SU(Y,$f_i$)
5.    if SU(Y,$f_i$) > δ then
6.      append $f_i$ to $F_{rel}$
7.    end if
8. end for
9. Order features $f_i \in F_{rel}$ in order of decreasing SU(Y,$f_i$)

-continued

```
10.    f_pivot = getFirst(F_rel)
11.    while f_pivot is not null do
12.        add f_pivot to F_opt
13.        f_cand = getNext(F_rel,f_pivot)
14.        while f_cand is not null do
15.            if AMB(f_pivot,f_cand)then
16.                remove f_cand from F_rel
17.            end if
18.        end while                                       (6)
19.        f_pivot = getNext(F_rel,f_pivot)
20.    end while
21.    return F_opt
``` where S is a set of training objects, Y is a set of classes, F is a set of features, $\delta$ is a relevance threshold, AMB( ) is an approximate Markov blanket criterion indicative of whether the feature $f_{pivot}$ acts as an approximate Markov blanket for the feature $f_{cand}$, and $F_{opt}$ is the optimal set of relevant features. In Algorithm (6) steps 3-8 perform irrelevance filtering by removing any feature whose relevance, as measured by the symmetric uncertainty $SU(Y,f_i)$, fails to meet the relevance threshold $\delta$. Step 9 then orders the relevant features in order of decreasing relevance, again measured using the symmetric uncertainty $SU(Y,f_i)$. Steps 10-20 perform the redundancy filtering, where $f_{cand}$ denotes the feature under consideration for possible removal and $f_{pivot}$ denotes the feature being considered as a possible approximate Markov blanket.

If Equation (5) is used as the approximate Markov blanket criterion AMB( ) in the Algorithm (6), then FCBF filtering is obtained. The inventors have studied the performance of the FCBF algorithm as it relates to multi-class problems, and have determined that the approximate Markov blanket of Equation (5) is a substantial cause of the FCBF producing loss of information in the multi-class context.

With reference to FIG. 1, the impact of FCBF feature filtering on the classification accuracy is evaluated. FIG. 1 plots a measure called the "accuracy loss" as a function of the number of classes in the set of classes Y. In each case, a maximum entropy classifier was trained using cross-validation with 5 folds. The classifier was trained with the initial feature set F, and was separately trained with the optimized feature subset $F_{opt}$ generated by filtering the initial feature set F using FCBF in accordance with Algorithm (6) using Equation (5) as the approximate Markov blanket criterion AMB( ). For 13 datasets processed, the accuracy loss was measured as the difference between these two measures. FIG. 1 plots the accuracy loss against the number of classes, as well as the linear least squares fitting. FIG. 1 shows a substantial correlation between the accuracy loss and the number of classes. All cases where FCBF does improve the accuracy (shown as a negative accuracy loss in FIG. 1) correspond to a small number of classes, namely four or fewer classes in the examples plotted in FIG. 1. On the other hand, for larger numbers of classes the loss may be as high as 10%.

With reference to FIG. 2, a table presents results abstracted from various cases reported with reference to FIG. 1, in which the FCBF feature filtering causes classifier accuracy loss. The dataset of the table of FIG. 2 includes two features $F_1$ and $F_2$ and three classes $y_0$, $y_1$, and $y_2$. Each row of the table of FIG. 2 represents the values for one object. The feature $F_1$ correlates with class value $y_1$, while the feature $F_2$ correlates with class value $y_2$. Neither feature correlates with class value $y_0$. Both features $F_1$ and $F_2$ are relevant to the set of classes Y and $SU(Y,F_1)=SU(Y,F_2)$. None of the two features is an exact Markov blanket of another because the information subsumption holds for some classes y but not for entire set of classes Y. However, the FCBF of Algorithm (6) employing the approximate Markov blanket criterion of Equation (5) would eliminate one of the two features $F_1$ and $F_2$.

In view of such observations, the inventors have concluded that the problem lies in the way the FCBF approximates Markov blankets. The uncertainty reduction may vary from one class to another, but the approximate Markov blanket of Equation (5) uses the uncertainty value for the entire set of classes Y to make a redundancy selection decision. The FCBF suffers from an accumulation effect when the uncertainty reduction for different classes are summed up when verifying the Markov blanket condition. The effect is substantial for multi-class cases in which the FCBF method tends to remove features which are not redundant.

In view of this, the feature filtering techniques disclosed herein employ improved approximate Markov blankets which compare an estimated uncertainty reduction respective to a set of training objects provided by a candidate feature for removal $f_{cand}$ with the estimated uncertainty reduction provided by a second feature $f_{pivot}$ which is under consideration as a possible approximate Markov blanket for the candidate feature $f_{cand}$. To overcome the deficiencies in the FCBF algorithm, the uncertainty reduction estimates are further made respective at least in part to a sub-set of the classes that is smaller than the set of classes Y. In some embodiments, the redundancy is approximated using estimated uncertainty reductions respective at least in part to a sub-set of the classes Y consisting of those classes of the set of classes Y targeted by at least one of the candidate feature $f_{cand}$ and the second feature $f_{pivot}$. In other embodiments, the redundancy of the candidate feature $f_{cand}$ respective to the second feature $f_{pivot}$ is approximated based on a plurality of per-class comparisons of the estimated uncertainty reductions, each per-class comparison being respective to one class of the set of classes Y. Other variant embodiments are also disclosed herein.

Figure 3:
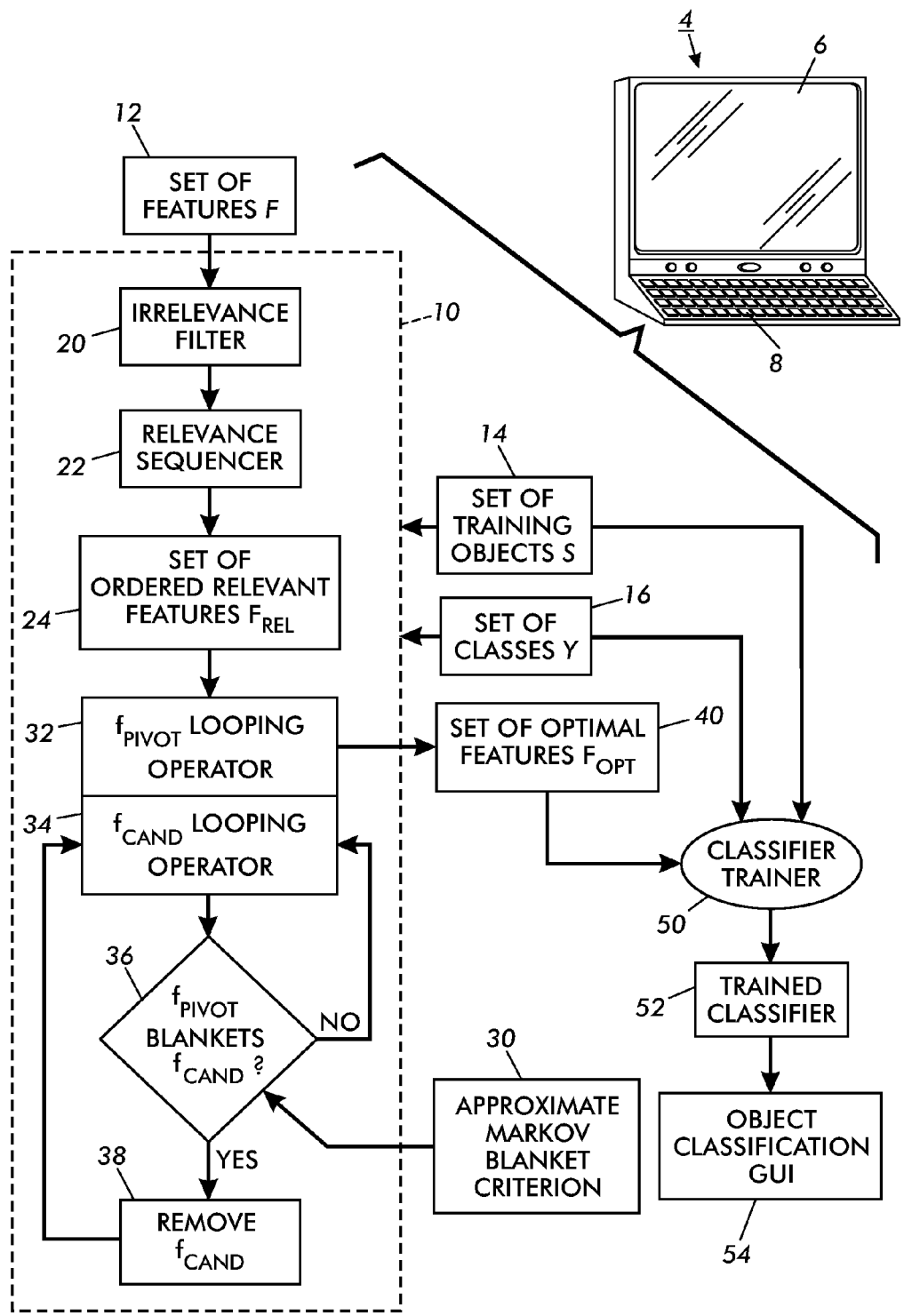
FIG. 3 diagrammatically shows a classifier training system including a features filtering component.

With reference to FIG. 3, a classifier trainer including features filtering is illustrated. The illustrative example is embodied as a computer 4 with a display 6 and a keyboard 8, mouse, or other user input device or plurality of user input devices, said computer 4 being programmed to perform a classifier training method including feature filtering shown by a diagrammatic block diagram in FIG. 3. Instead of the illustrated computer 4, the classifier trainer and feature filtering can be embodied as an Internet server accessed by a suitable Internet-capable device, a handheld digital device such as a personal data assistant (PDA), a mainframe computer, a laptop computer, or so forth. It is also contemplated for some portions to be embodied by analog circuitry, application specific integrated circuitry (ASIC), or so forth. The classifier trainer and feature filtering can also be embodied as a storage medium storing instructions executable on the illustrated computer 4 or on another digital processor to perform the classifier training and feature filtering methods. Such a storage medium may be, for example, a magnetic disk, an optical disk, a read-only memory (ROM), a random access memory (RAM), a solid state electrostatic memory such as a flash memory, an Internet server storage medium, or so forth.

A feature filtering system 10 is independent of the classifier choice and is applied prior to classifier training, so as to identify an optimal set of relevant features to be used in classifying objects. The input to the feature filtering system is a set of features F 12 which may number in the hundreds, thousands, tens or hundreds of thousands, billions, or more features, and it is desired to reduce this to a smaller optimal set of relevant features, perhaps numbering in the hundreds, although fewer or more features are contemplated for the optimal set of relevant features. The feature filtering should also be done in a way that does not adversely impact the classification. In some instances the feature filtering may improve classification accuracy; however, some reduction in classification accuracy is contemplated in some instances due to the feature filtering as an acceptable tradeoff in return for advantages such as faster learning and prediction obtained by the feature filtering. The feature filtering is performed respective to a set of training objects S 14. The type of the objects and the nature of the features is problem-dependent. As an illustrative example, the objects may be images and the features characteristics of image key patches, global image features such as aspect ratio, image contrast, or so forth. As some other examples, the objects may in other applications be multimedia documents, audio/video files or segments, text documents, spreadsheets, or so forth. The feature filtering system 10 also receives as input a set of classes Y 16. The set of training objects 14 are annotated or otherwise preclassified respective to classes of the set of classes 16. Such preclassification of the training objects 14 can be performed manually or by any other available mechanism. The classification can be either hard classification in which each training object is assigned exclusively to a single class of the set of classes 16, or can be soft classification in which a given training object may be assigned partially or probabilistically to one, two, three, or more different classes of the set of classes 16.

The features filtering system 10 first applies an irrelevance filter 20, which for example may suitably implement lines 3-8 of Algorithm (6). The output of the irrelevance filter 20 is a set of relevant features which are then ordered by a relevance sequencer 22 in order of decreasing relevance, for example by implementing line 9 of Algorithm (6). The output of the relevance sequencer 22 is a set of relevant features $F_{rel}$ 24 ordered according to the relevance measure (for example, the symmetric uncertainty with respect to class set Y in the illustrated embodiment).

A redundant features filter is then applied, which in the illustrated embodiment implements lines 10-20 of Algorithm (6) using an approximate Markov blanket criterion 30 that is different from the approximate Markov blanket criterion of Equation (5) used in the fast correlation based filtering (FCBF) technique. The approximate Markov blanket criterion 30 makes uncertainty reduction estimates respective at least in part to a sub-set of the classes that is smaller than the set of classes Y 16. In the block diagram representation of FIG. 3, the outer iterative loop over the second feature $f_{pivot}$ defined by lines 10, 11, 19, and 20 of Algorithm (6) is diagrammatically represented by the $f_{pivot}$ looping operator 32. The inner iterative loop over the candidate feature $f_{cand}$ defined by lines 13, 14, and 18 of Algorithm (6) is diagrammatically represented by the $f_{cand}$ looping operator 34. The decision block defined by lines 15-17 of Algorithm (6) is diagrammatically represented in FIG. 3 by the decision block 36 and the operation 38 of removing $f_{cand}$ conditional upon the decision block 36 indicating that $f_{pivot}$ is an approximate Markov blanket for $f_{cand}$ using the approximate Markov blanket criterion 30. The output of Algorithm (6) and of the corresponding diagrammatically illustrated feature filtering system 10 is the optimized set of relevant features $F_{opt}$ 40, corresponding to line 21 of Algorithm (6).

The optimized set of relevant features $F_{opt}$ 40 can be used in various ways. In the system of FIG. 1, a classifier trainer 50 trains a classifier to generate a trained classifier 52 configured or trained to classify an input object into one (for hard classification) or optionally more (for soft classification) classes of the set of classes 16. The classifier trainer 50 uses the same set of training objects 14 as was used for the feature filtering, or optionally uses a different set of training objects. In either case, the classifier trainer 50 further uses the optimized set of relevant features $F_{opt}$ 40. The trained classifier 52 can in general be any type of multi-class classifier, such as a maximum entropy classifier, a support vector machine (SVM) classifier (extended to multiple classes), a neural network-based multi-class classifier, or so forth. The classifier trainer 50 can employ any suitable algorithm to generate or train the trained classifier 52. The choice of multi-class classifier and of the training method are made based on characteristics of the type of objects being classified, characteristics of the features, and so forth.

The trained classifier 52 can be variously utilized. For example, the trained classifier 52 can be a component of an automated object indexing or organizational system. In another application, illustrated in FIG. 3, the trained classifier 52 can be used with an object classification graphical user interface (GUI) 54 operating in conjunction with the input/output devices 6, 8 of the computer 4. A human operator interfacing with the object classification GUI 54 can select or indicate input objects for classification and can review the classifications assigned to such input objects by the trained classifier 52.

Having described the illustrative embodiment of the features filtering system 10 shown in FIG. 3, some illustrative examples of the approximate Markov blanket criterion 30 are described, that suitably make uncertainty reduction estimates respective at least in part to a sub-set of the classes that is smaller than the set of classes Y 16.

In one illustrative approximate Markov blanket criterion, the approximate Markov blanket criterion for the FCBF method set forth in Equation (5) is modified by adding an extra condition in order to suppress or eliminate the accumulative effect. As noted previously, the inventors have determined that the FCBF suffers from an accumulation effect when the uncertainty reduction for different classes are summed up when verifying the Markov blanket condition. The effect is substantial for multi-class cases in which the FCBF method tends to remove features which are not redundant.

The first illustrative embodiment of the approximate Markov blanket criterion 30 makes use of a concept of a "targeted" class. A class y∈Y is targeted by a feature $f_i$ if there exist at least two items in the set of training objects S 14 with different values of $f_i$, both of which objects are assigned to the class y. In terms of the conditional probability, y is targeted by feature $f_i$ if $H(f_i|Y=y)>0$. The set of classes targeted by the feature $f_i$ is denoted $S_Y(f_i)$, where $S_Y(f_i)=\{y|H(f_i|Y=y)>0\}$.

The first illustrative embodiment of the approximate Markov blanket criterion 30 modifies the FCBF criterion of Equation (5) to better accommodate multi-class cases, by verifying that the set of target classes of the pivot feature $f_{pivot}$ subsumes the set of target classes of the candidate feature $f_{cand}$, that is, an additional condition is imposed that $S_Y(f_{pivot}) \supseteq S_Y(f_{cand})$. With this additional constraint, the first illustrative embodiment of the approximate Markov blanket criterion 30 can be written as follows:

Feature $f_{pivot}$ is an approximate Markov blanket for feature $f_{cand}$ if $$SU(Y\!,f_{pivot}) \geq SU(Y\!,f_{cand}) \text{ and}$$

$$SU(f_{pivot},f_{cand}) > SU(Y\!,f_{pivot}) \text{ and}$$

$$S_Y(f_{pivot}) \supseteq S_Y(f_{cand}) \qquad (7).$$

With brief reference back to FIG. 2, for that example $S_Y(f_{pivot})=\{y_0,y_1\}$ and $S_Y(f_{cand})=\{y_0,y_2\}$. Since neither of the two target sets subsumes the other, the approximate Markov blanket criterion of Equation (7) would retain both feature $f_{pivot}$ and $f_{cand}$. Based on evaluative analyses, it is believed that this modified approximate Markov blanket criterion of Equation (7) resists the accumulative effect and filters out redundant features without the accuracy loss. The approximate Markov blanket criterion of Equation (7) can be directly used as the approximate Markov blanket criterion AMB( ) in Algorithm (6), without any modification of Algorithm (6). However, computation can be streamlined by recognizing that the ordering by descending relevance performed by line 9 of Algorithm (6), coupled with the specific choice of iterative looping through $f_{pivot}$ and $f_{cand}$, ensures that the first condition $SU(Y,f_{pivot}) \geq SU(Y,f_{cand})$ is always satisfied at line 15 of Algorithm (6). In view of this, the approximate Markov blanket criterion of Equation (7) can optionally be simplified when used as the criterion AMB( ) of Algorithm (6) as follows:

Feature $f_{pivot}$ is an approximate Markov blanket for feature $f_{cand}$ if $$SU(f_{pivot},f_{cand}) > SU(Y,f_{pivot}) \text{ and}$$

$$S_Y(f_{pivot}) \supseteq S_Y(f_{cand}) \quad (8).$$

A second illustrative embodiment of the approximate Markov blanket criterion 30 is now described. This approach incorporates into the approximate Markov blanket criterion conditions indicative of the contribution of each class to the conditional entropy $H(Y|X)$ and the symmetric uncertainty $SU(Y,X)$. The second illustrative embodiment uses both preclass uncertainty and feature correlation to build the Markov blanket approximation. The information gain $I(Y;X)$ set forth in Equation (1) is written on a per-class basis as follows:

$$I(Y; X) = H(Y) - H(Y|X) \quad (9)$$
$$= \sum_y \sum_x P(x)P(y|x)\log_2 P(y|x) - \sum_y P(y)\log_2 P(y)$$
$$= \sum_{y \in Y} I(Y = y; X)$$

where $I(Y=y;X)$ is the contribution of class y to the aggregated information gain $I(Y;X)$, and $$I(Y = y; X) = \sum_x P(x)P(y|x)\log_2 P(y|x) - P(y)\log_2 P(y) \quad (10)$$

After the normalization, the symmetric uncertainty SU may be similarly decomposed on a per-class basis. For two random variables Y and X, the following holds:

$$SU(y; X) = \frac{H(Y = y) - I(Y = y; X)}{H(Y) + H(X)} \quad (11)$$

where $H(Y=y)=p(y)\log_2(y)$ and therefore:

$$SU(Y, X) = \sum_{y \in Y} SU(y, X). \quad (12)$$

A relevant feature $f_i$ strictly subsumes a relevant feature $f_j$ if $SU(y,f_i) > SU(y,f_j)$ for all $y \in Y$. Combining these conditions for all classes $y \in Y$ yields the second illustrative approximate Markov blanket criterion:

Feature $f_{pivot}$ is an approximate Markov blanket for feature $f_{cand}$ if
for every $y \in Y$:

$$SU(Y=y,f_{pivot}) > SU(Y=y,f_{cand}) \text{ and}$$

$$SU(f_{pivot},f_{cand}) > SU(Y,f_{pivot}) \quad (13).$$

The approximate Markov blanket criterion of Equation (13) is suitably used as the approximate Markov blanket criterion AMB( ) in Algorithm (6), with the following changes made to Algorithm (6) for consistency and to preserve scalability. In lines 4-10 of Algorithm (6), the calculation of $SU(Y,f_i)$ is suitably extended by calculation of per-class uncertainty vector $[SU(y_1,f_i), \ldots, SU(y_{|Y|},f_i)]$ where $|Y|$ denotes the number of classes in the set of classes Y 16. The ordering of values is then done by decreasing relevance respective to one class, say class $y_1$. The second part of Algorithm (6) is modified in order to compare uncertainty vectors for a pair of features in $F_{rel}$ 24. This results in computational complexity of order $O(M|Y|N^2)$ for the worst case, and computational complexity of order $O(M|Y|N \log N)$ on average.

To validate the disclosed feature filtering approaches, four different corpora were used as training sets, and the accuracy of a maximum entropy classifier was measured, trained using an unfiltered features set; (ii) a features set filtered using the FCBF approximate Markov blanket criterion of Equation (5); (iii) a features set filtered using the approximate Markov blanket criterion of Equation (8); and (iv) a features set filtered using the approximate Markov blanket criterion of Equation (13). The filtering in each of (ii), (iii), and (iv) used Algorithm (6), with the modifications disclosed herein in the case of filtering (iv). All tests were run using the cross-validation protocol. All four differently trained classifiers behaved well on all the datasets. For four or fewer classes, all four differently trained classifiers performed similarly. For higher numbers of classes, however, the filters trained using the approximate Markov blanket criteria of Equation (8) or of Equation (13) performed better than the classifier trained using the FCBF filtered features set, exhibiting reduced accuracy loss due to the filtering.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method including filtering a set of features to remove selected features that are substantially redundant respective to relating a set of classes and a set of training objects classified respective to the set of classes, the feature filtering method comprising:
   selecting a candidate feature of the feature set;
   measuring redundancy of the candidate feature respective to a second feature based on comparison of an estimated uncertainty reduction respective to the set of training objects provided by the candidate feature and provided by the second feature, the estimated uncertainty reductions being further respective at least in part to a sub-set of the classes that is smaller than the set of classes;
   filtering out the candidate feature if the redundancy satisfies a filtering criterion; and
   repeating the selecting, measuring, and filtering for a plurality of pairs of candidate and second features to generate a filtered set of features.

2. The method as set forth in claim 1, further comprising:
prior to the selecting, measuring, filtering, and repeating operations, removing irrelevant features that are substantially irrelevant respective to relating the set of classes and the set of training objects classified respective to the set of classes.

3. The method as set forth in claim 1, further comprising:
training a classifier using the set of training objects and the filtered set of features, the trained classifier configured to output at least one class label corresponding to an input object; and
classifying at least one input object using the trained classifier.

4. The method as set forth in claim 1, wherein the measuring comprises:
measuring the redundancy using estimated uncertainty reductions respective at least in part to a sub-set of the classes that consists of those classes of the set of classes targeted by at least one of the candidate feature and the second feature.

5. The method as set forth in claim 1, wherein the measuring comprises:
measuring redundancy of the candidate feature respective to the second feature based on a plurality of per-class comparisons of the estimated uncertainty reductions, each per-class comparison being respective to one class of the set of classes.

6. The method as set forth in claim 1, wherein the estimated uncertainty reductions further respective at least in part to a sub-set of the classes that is smaller than the set of classes comprises:
determining whether a sub-set of classes targeted by the second feature subsumes a sub-set of classes targeted by the candidate feature, the filtering not filtering out the candidate feature if the sub-set of classes targeted by the second feature does not subsume the sub-set of classes targeted by the candidate feature.

7. The method as set forth in claim 1, wherein the measuring comprises:
computing an approximate Markov blanket criterion operatively equivalent to:
Feature $f_{pivot}$ is an approximate Markov blanket for feature $f_{cand}$ if $$SU(Y, f_{pivot}) \geq SU(Y, f_{cand}) \text{ and}$$

$$SU(f_{pivot}, f_{cand}) > SU(Y, f_{pivot}) \text{ and}$$

$$S_Y(f_{pivot}) \supseteq S_Y(f_{cand})$$

where $f_{cand}$ denotes the candidate feature, $f_{pivot}$ denotes the second feature, and Y denotes the set of classes, the filtering criterion including said approximate Markov blanket criterion.

8. The method as set forth in claim 1, wherein the measuring comprises:
computing an approximate Markov blanket criterion comprising:
Feature $f_{pivot}$ is an approximate Markov blanket for feature $f_{cand}$ if
for every $y \in Y$:

$$SU(Y=y, f_{pivot}) > SU(Y=y, f_{cand}) \text{ and}$$

$$SU(f_{pivot}, f_{cand}) > SU(Y, f_{pivot})$$

where $f_{cand}$ denotes the candidate feature, $f_{pivot}$ denotes the second feature, and Y denotes the set of classes, the filtering criterion including said approximate Markov blanket criterion.

9. The method as set forth in claim 1, further comprising:
training a classifier using the set of training objects, the set of classes, and the filtered set of features.

10. The method as set forth in claim 9, further comprising:
classifying an input object respective to the set of classes using the trained classifier; and
displaying an identification of one or more classes associated by the classifying with the input object.

11. A storage medium storing instructions executable to perform a feature filtering method comprising (i) providing a set of relevant features and a set of training objects classified respective to a set of classes, (ii) selecting from the set of relevant features a candidate feature and a second feature, (iii) computing an approximate Markov blanket criterion indicative of whether the candidate feature is redundant in view of the second feature, the approximate Markov blanket criterion including at least one dependency on less than the entire set of classes, and (iv) defining an optimized set of relevant features consisting of a sub-set of the set of relevant features from which features indicated as redundant by the selecting and computing are removed.

12. The storage medium as set forth in claim 11, wherein the stored instructions are executable to perform said feature filtering method in which the approximate Markov blanket criterion is operatively equivalent to:
Feature $f_{pivot}$ is an approximate Markov blanket for feature $f_{cand}$ if $$SU(Y, f_{pivot}) \geq SU(Y, f_{cand}) \text{ and}$$

$$SU(f_{pivot}, f_{cand}) > SU(Y, f_{pivot}) \text{ and}$$

$$S_Y(f_{pivot}) \supseteq S_Y(f_{cand})$$

where $f_{cand}$ denotes the candidate feature, $f_{pivot}$ denotes the second feature, and Y denotes the set of classes.

13. The storage medium as set forth in claim 11, wherein the stored instructions are executable to perform said feature filtering method in which the approximate Markov blanket criterion includes at least one dependency on less than the entire set of classes comprising a condition that a sub-set of classes targeted by the second feature subsumes a sub-set of classes targeted by the candidate feature.

14. The storage medium as set forth in claim 11, wherein the stored instructions are executable to perform said feature filtering method in which the approximate Markov blanket criterion comprises:
Feature $f_{pivot}$ is an approximate Markov blanket for feature $f_{cand}$ if
for every $y \in Y$:

$$SU(Y=y, f_{pivot}) > SU(Y=y, f_{cand}) \text{ and}$$

$$SU(f_{pivot}, f_{cand}) > SU(Y, f_{pivot})$$

where $f_{cand}$ denotes the candidate feature, $f_{pivot}$ denotes the second feature, and Y denotes the set of classes.

15. The storage medium as set forth in claim 11, wherein the stored instructions are executable to perform said feature filtering method in which the approximate Markov blanket criterion includes at least one dependency on less than the entire set of classes comprising a condition that a measure of relevance of the second feature respective to a selected class value be greater than a corresponding measure of relevance of the candidate feature respective to the selected class value.

16. The storage medium as set forth in claim 11, wherein the stored instructions are executable to perform said feature filtering method in which the approximate Markov blanket criterion includes at least one dependency on less than the entire set of classes comprising a condition that a measure of relevance of the second feature respective to a class value be greater than a corresponding measure of relevance of the candidate feature respective to the class value for every class value in the set of classes.

17. A classifier trainer comprising a processor configured to perform a method comprising:
   training a classifier to classify an object respective to a set of classes, the training employing a set of pre-classified training objects and an optimized set of relevant features;
   selecting the optimized set of relevant features from a set of relevant features using an approximate Markov blanket criterion that includes at least one dependency on less than the entire set of classes; and
   selecting the set of relevant features from a set of features based on relevance of the features to the classifications of the set of pre-classified training objects.

18. The classifier trainer as set forth in claim 17, wherein the processor is configured to perform said method in which the approximate Markov blanket criterion includes at least one dependency on less than the entire set of classes comprising comparison of a measure of relevance of candidate and second features of the set of relevant features respective to a class value of the set of classes.

19. The classifier trainer as set forth in claim 17, wherein the processor is configured to perform said method in which the approximate Markov blanket criterion includes at least one dependency on less than the entire set of classes comprising a comparison of a measure of relevance of candidate and second features of the set of relevant features respective to each class value of the set of classes.

20. The classifier trainer as set forth in claim 17, wherein the processor is configured to perform said method in which the approximate Markov blanket criterion includes at least one dependency on less than the entire set of classes comprising a condition that a sub-set of classes targeted by a second feature subsumes a sub-set of classes targeted by a candidate feature.

21. The classifier trainer as set forth in claim 17, wherein the processor is configured to perform said method in which the approximate Markov blanket criterion includes at least one dependency on less than the entire set of classes comprising a comparison of uncertainty values for second and candidate features respective to less than the entire set of classes.

* * * * *